(12) United States Patent
Gautam et al.

(10) Patent No.: US 9,336,564 B2
(45) Date of Patent: *May 10, 2016

(54) GPU ENABLED DATABASE SYSTEMS

(71) Applicant: International Business Machines Corporation, Armonk, NY (US)

(72) Inventors: Akshay Gautam, New Delhi (IN); Ritesh K. Gupta, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 152 days.

This patent is subject to a terminal disclaimer.

(21) Appl. No.: 13/756,780

(22) Filed: Feb. 1, 2013

(65) Prior Publication Data

US 2013/0141444 A1    Jun. 6, 2013

Related U.S. Application Data

(63) Continuation of application No. 12/765,459, filed on Apr. 22, 2010, now Pat. No. 8,392,463.

(51) Int. Cl.
    *G06F 17/30*      (2006.01)
    *G06F 17/00*      (2006.01)
    *G06T 3/00*       (2006.01)

(52) U.S. Cl.
    CPC ............ *G06T 3/00* (2013.01); *G06F 17/30445* (2013.01); *G06F 17/30498* (2013.01)

(58) Field of Classification Search
    USPC ........... 707/626; 719/328; 718/106; 717/119, 717/140
    See application file for complete search history.

(56) References Cited

U.S. PATENT DOCUMENTS

| 7,792,822 | B2 | 9/2010 | Galindo-Legaria et al. |
| 7,970,872 | B2 | 6/2011 | Liu et al. |
| 8,286,198 | B2 * | 10/2012 | Munshi et al. ................ 719/328 |
| 8,813,079 | B1 * | 8/2014 | Lindo et al. .................... 718/100 |

FOREIGN PATENT DOCUMENTS

WO    WO 2008/090336 A2    7/2008

OTHER PUBLICATIONS

He et al., "Relational query coprocessing on graphics processors", Sep. 2009, Transactions on Database Systems 34, 4 (2009), ACM, New York, NY, 35 pp.*
Boncz, et al., "Database Architecture Optimized for the new Bottleneck: Memory Access", 1999, Edinburgh, Scotland, 25th VLDB Conference, 12 pp.

(Continued)

*Primary Examiner* — Yicun Wu
(74) *Attorney, Agent, or Firm* — Kali Law Group, P.C.

(57) ABSTRACT

Methods for resolving a number of in-memory issues associated with parallel query execution of a database operation on a database utilizing a graphics processing unit (GPU) are presented including: tying a table choice to a number of accesses per second made to a table; and synchronizing threads in a same shared GPU multiprocessor to avoid compromising concurrency, and where the parallel query execution of the database operation is performed solely by the GPU. In some embodiments, methods further include storing data from the GPU to a disk to solve volatility; and enabling a user, at any time, to query the amount of memory being used by the table created by the user to monitor memory consumption.

17 Claims, 7 Drawing Sheets

(56) References Cited

OTHER PUBLICATIONS

Lindholm, et al., "NVIDIA Tesla: A Unified Graphics and Computing Architecture", 2008, IEEE, Santa Clara, CA (US) 95050, 17 pp.
Ding et al., "Using Graphics Processors for High Performance IR Query Processing", IW3C2 2009, Madrid, Spain, 10 pp.
Fang et al., "GPUQP: Query Co-Processing Using Graphics Processors", SIGMOD 2007, Beijing, China, 3 pp.
Gosink et al., "Data Parallel Bin-Based Indexing for Answering Queries on Multi-Core Architectures", IDAV 2009, Davis, California, 19 pp.
Govindaraju et al., "Fast Computation of Database Operations using Graphics Processors", SIGMOD 2004, Paris, France, pp. 206-217.
Govindaraju et al., "GPUTeraSort: High Performance Graphics Co-processor Sorting for Large Database Management", SIGMOD 2006, Chicago, Illinois, 12 pp.
Hardavellas et al., "Database Servers on Chip Multiprocessors: Limitations and Opportunities", 2007 Asilomar California USA, 3rd Biennial CIDR (Conf on Innovative Data Research), 9 pp.
Manavski, et al., "CUDA compatible GPU cards as efficient hardware accelerators for Smith-Waterman sequence alignment", BITS 2007, Naples, Italy, 9 pp.
Ailamaki et al., "DBMSs on a Modern Processor: Where Does Time Go?" Edinburgh Scotland (GB) 1999, 25th VLDB Conf, 12 pp.
Ailamaki et al., "Query Co-Processing on Commodity Processors", Seoul KR, Sep. 2006, VLDB '06, 1 pp.
Zukowski, et al., "MonetDB/X100—A DBMS in the CPU Cache", 2005 IEEE Bulletin, 6 pp.
NVIDIA CUDA™ Programming Guide, Ver 2.1, Dec. 2008.
Ke et al., "Application of graphics processors to database technologies Application of graphics processors to database technologies", Jrnl of Zhejiang Univ (Engineering Science) 2009 vol. 43 No. 8, pp. 1349-1360, Abstract only.
IBMsolidDB Administrator Guide, Ver. 6.1, Jun. 2008, pp. 1-89 & title page.
Luebke, et al., "GPGPU: General Purpose Computation on Graphics Hardware" SIGGRAPH 2004, 88 pp.
Di Blas et al., "Data Monster—Why graphics processors will transform database processing", Sep. 2009, New York, US, Spectrum IEEE, vol. 46 No. 9, pp. 46-51, New York, NY, US.
Cieslewicz et al., "Database Optimizations for Modern Hardware", May 2008, Proceedings of the IEEE, vol. 96, No. 5, pp. 863-878, New York, NY, US.
Bingsheng He et al., "Relational Joins on Graphics Processors", 2008, ACM SIGMOD Int'l Conf on Mgmt of Data, Vancouver, BC, CA, 14 pp.
Bingsheng He et al., "Relational Query Coprocessing on Graphics Processors", Dec. 2009, ACM Transactions on Database Systems, vol. 34, No. 4, Article 21, pp. 1-39, New York, NY, US.
PCT International Search Report, PCT/EP2011/055032 filed Mar. 31, 2011, together with the Written Opinion of the ISA, mailed Jul. 27, 2011, 11 pp.
Article, "New on CUDA Zone: Palo GPU from Jedox", Apr. 16, 2010, CUDA: Week in Review Issue #17, NVIDIA Corp (Global Newsletter) 3 pp.
IBM SolidDB Administrator Guide, Ver 6.1. Jun 2008, pp. 1-89 and title page.
Letter re Third Party submission by Dr. Tobias Lauer, Dec. 16, 2011, 3 pp.
Poster presentation, "Palo+GPU: A CUDA-Powered in-Memory OLAP Server" Sep. 30, 2009, NVIDIA GPU Tech. Conf., San Jose, CA 1pp.
Press Release. "Palo Global Roadshow 2010 Starts in Germany", Apr. 13, 2010, Pressbox, 2pp.

* cited by examiner

GPU ENABLED DATABASE SYSTEMS

CROSS-REFERENCE TO RELATED APPLICATION

Under 35 USC S 120, this application is a continuation and claims the benefit of priority to U.S. application Ser. No. 12/765,459, filed Apr. 22, 2010, entitled GPU ENABLED DATABASE SYSTEMS, which is incorporated herein by reference in its entirety.

BACKGROUND

Traditional database systems execute database queries on disk-based tables. Research has shown that traditional disk-based database query execution often suffers from high penalties arising from for example, memory latencies, processors waiting for data to be fetched from the memory, and L1 data and L2 instruction stalls. Therefore, to tackle this problem, multiprocessors are being increasingly utilized for executing database queries. Complementary to the disk-based tables are the in-memory tables. In-memory tables are faster than disk-based tables because the fetching from and loading to the disk component is eliminated. In-memory enabled systems can therefore use more efficient techniques to provide maximum performance.

A Graphics Processing Unit (GPU) is a massively parallel piece of hardware which can be thought of as several processors with its own local memory. A GPU may operate as an independent co-processor within the host computer. Back in the late nineties, the games industry provided the necessary impetus for the development of the GPU for accelerating graphics in games. Recently, architectures have been configured to support programmability. That is, general-purpose programs may be written to run on the GPU. GPU enabled programs are well suited to problems that involve data-parallel computations where the same program is executed on different data with high arithmetic intensity.

As such, GPU enabled database systems are presented herein.

BRIEF SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

As such, methods for resolving a number of in-memory issues associated with parallel query execution of a database operation on a database utilizing a graphics processing unit (GPU) are presented including: tying a table choice to a number of accesses per second made to a table, where the table choice is a first of the number of in-memory issues; and synchronizing threads in a same shared GPU multiprocessor to avoid compromising concurrency, where concurrency is a second of the number of in-memory issues, and where the parallel query execution of the database operation is performed solely by the GPU. In some embodiments, methods further include storing data from the GPU to a disk to solve volatility, where volatility of data is a third of the number of in-memory issues; and enabling a user, at any time, to query the amount of memory being used by the table created by the user to monitor memory consumption, where memory consumption is a fourth of the number of in-memory issues. In some embodiments, methods further include setting memory consumption parameters to control a manner in which data is written to the memory or the disk. In some embodiments, methods further include synchronizing threads in different shared GPU multiprocessors through a global memory to avoid compromising concurrency.

In some embodiments, the parallel execution includes: receiving a query by a host, the query including at least two database relations; starting at least one GPU kernel of a number of GPU kernels, where the at least one GPU kernels include a GPU memory allocated at runtime; hash partitioning the at least two database relations by the GPU kernel resulting in at least two hash partitioned database relations, where each of the at least two hash partitioned database relations includes a partition key; loading the at least two hash partitioned database relations into the GPU memory; loading the at least two hash partitioned database relations and partition keys corresponding with the at least two hash partitioned database relations into the GPU memory; building a hash table for a smaller of the at least two hash partitioned database relations; and executing the query by the at least one GPU kernel thereby providing in hash table GPU memory access.

In other embodiments, computing device program products for resolving a number of in-memory issues associated with parallel query execution of a database operation on a database utilizing a graphics processing unit (GPU) are presented including: a computer readable medium; programmatic instructions for tying a table choice to a number of accesses per second made to a table, where the table choice is a first of the number of in-memory issues; and programmatic instructions synchronizing threads in a same shared GPU multiprocessor to avoid compromising concurrency, where concurrency is a second of the number of in-memory issues, where the parallel query execution of the database operation is performed solely by the GPU, and where the programmatic instructions are stored on the computer readable storage medium. In some embodiments, computer program products further include programmatic instructions storing data from the GPU to a disk to solve volatility, where volatility of data is a third of the number of in-memory issues; and programmatic instructions enabling a user, at any time, to query the amount of memory being used by the table created by the user to monitor memory consumption, where memory consumption is a fourth of the number of in-memory issues. In some embodiments, computer program products further include programmatic instructions setting memory consumption parameters to control a manner in which data is written to the memory or the disk. In some embodiments, computer program products further include programmatic instructions synchronizing threads in different shared GPU multiprocessors through a global memory to avoid compromising concurrency.

Graphics processing unit (GPU) enabled database systems for parallel query execution are presented including: a database; and a GPU in communication with the database, where the GPU is configured resolving a number of in-memory issues associated with parallel query execution of a database operation on the database utilizing a graphics processing unit (GPU), the resolving including, tying a table choice to a number of accesses per second made to a table, where the table choice is a first of the number of in-memory issues, and synchronizing threads in a same shared GPU multiprocessor to avoid compromising concurrency, where concurrency is a second of the number of in-memory issues, and where the parallel query execution of the database operation is performed solely by the GPU. In some embodiments, systems further include storing data from the GPU to a disk to solve volatility, where volatility of data is a third of the number of in-memory issues; and enabling a user, at any time, to query the amount of memory being used by the table created by the user to monitor memory consumption, where memory consumption is a fourth of the number of in-memory issues. In some embodiments, systems further include setting memory consumption parameters to control a manner in which data is written to the memory or the disk and synchronizing threads in different shared GPU multiprocessors through a global memory to avoid compromising concurrency.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks Referring now to the Figures, the flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Compute Unified Device Architecture (CUDA™) is a toolkit that allows general purpose programs written in a C-like language to be executed. CUDA™ toolkit exposes the underlying target hardware via a C-like API. CUDA™ is designed to increase performance in many data parallel applications by supporting execution of thousands of threads in parallel. As such, a compiled CUDA™ program may scale with the advances in hardware. There are at least two ways a GPU-enabled database may be implemented—a) in one embodiment, a full-fledged database system may be enabled, and b) a scratch pad for accelerating other database queries may be enabled, that is, a GPU-memory database for just executing database queries may be enabled.

Figure 1:
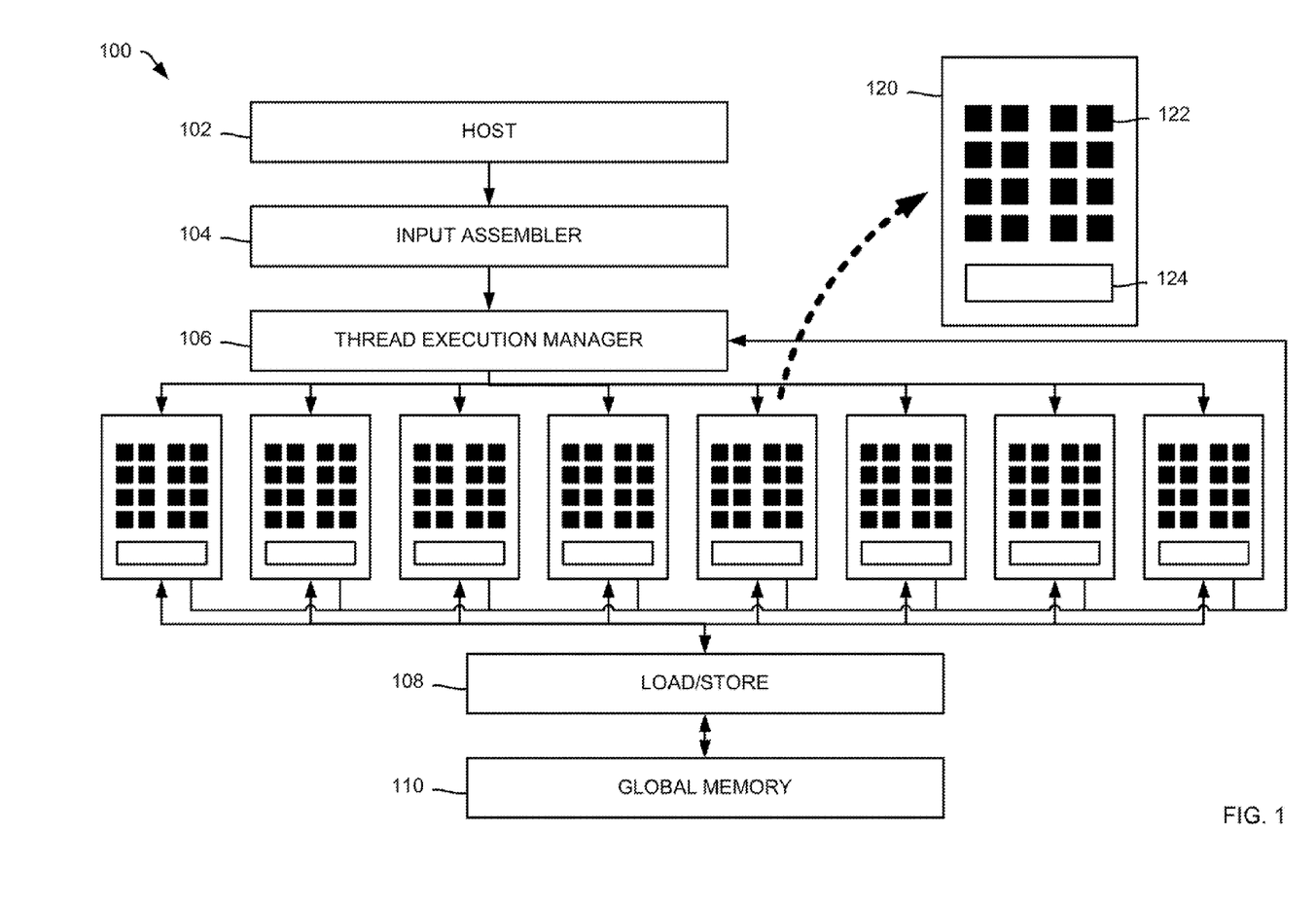
FIG. 1 is an illustrative representation of a G80 Architecture compliant GPU in accordance with embodiments of the present invention.

FIG. 1 is an illustrative representation 100 of a G80 Architecture compliant graphics processing unit (GPU) in accordance with embodiments of the present invention. As illustrated, a G80 Architecture may include a number of components including: a host 102, a input assembler 104, a thread execution manager 106, a load/store 108, and a global memory 110. These components function in concert with a number of shared multiprocessors 120. A typical G80 Architecture compliant GPU may contain 128 stream processors 122 divided into 8 shared multiprocessors 120, each containing 16 streaming processors. Each shared multiprocessor 120 contains local shared memo 124 which is shared by the threads running on the shared multiprocessor. This is advantageous because it helps in coalesced access when groups of threads operate on nearby data.

Figure 2:
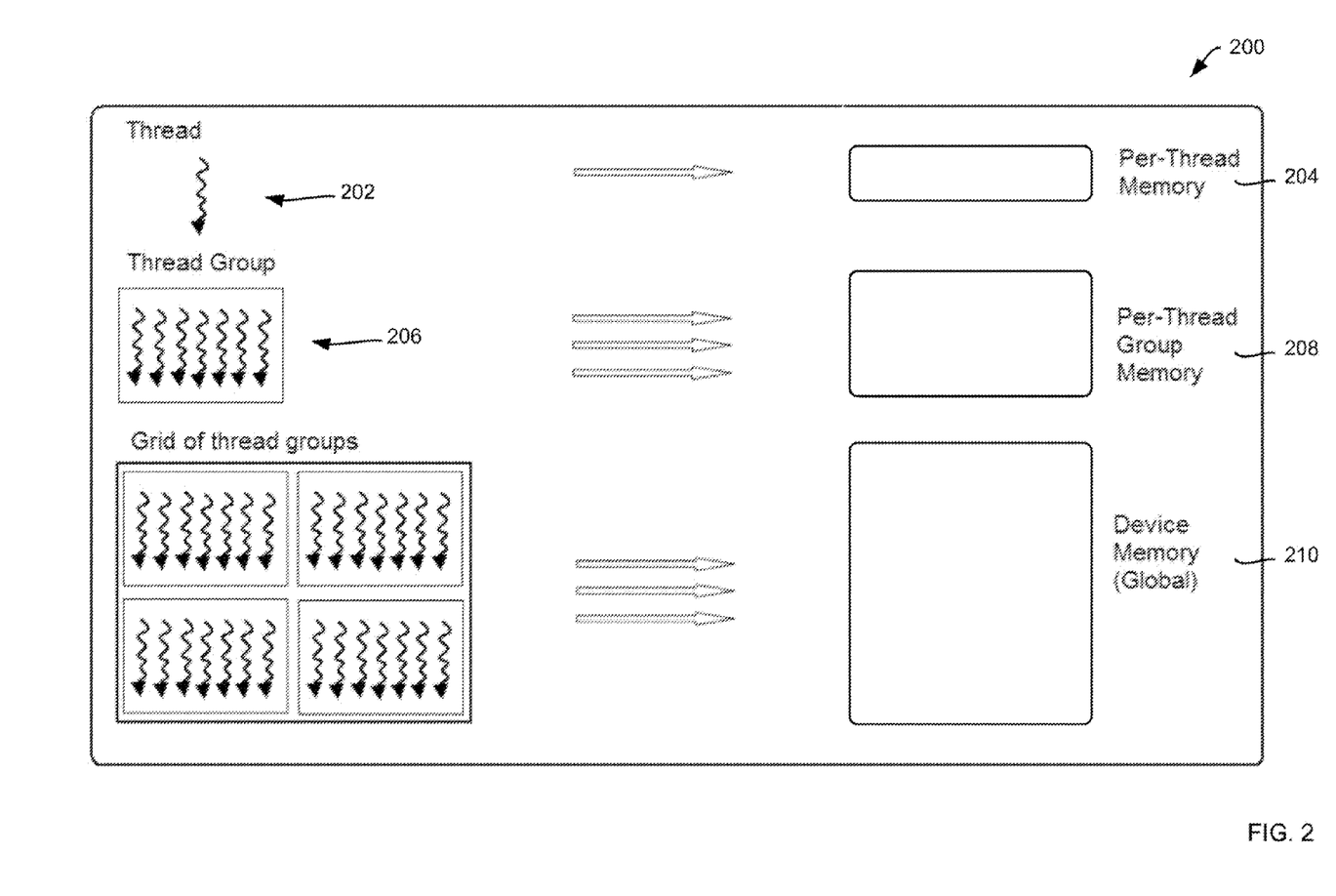
FIG. 2 is an illustrative representation of a memory hierarchy on a GPU in accordance with embodiments of the present invention.

FIG. 2 is an illustrative representation of a memory hierarchy 200 on a GPU in accordance with embodiments of the present invention. Memory hierarchy 200 includes per-thread memory 204, per-thread group memory 208, and global/device memory 212. Global/device memory 212 is accessible by any thread running on the GPU. Reads and writes to and from device memory 212 are slow as compared to other memories 204 and 208. GPU threads 208 are extremely lightweight as compared to CPU threads and hence there is essentially zero overhead in the creation of thousands of threads. Notably, threads are not run individually on a processor. Rather multiple threads are run in thread groups 206 called warps which are executed on a single shared multiprocessor (see FIG. 1, 120). Threads in a warp can share the memory local to the shared multiprocessor. This ability leads to an increase in performance because fewer reads/writes are made to the global memory to fetch and load data. That is, data is fetched once into a shared memory of the shared multiprocessor; computations are performed; and results are uploaded to the global memory.

Figure 3:
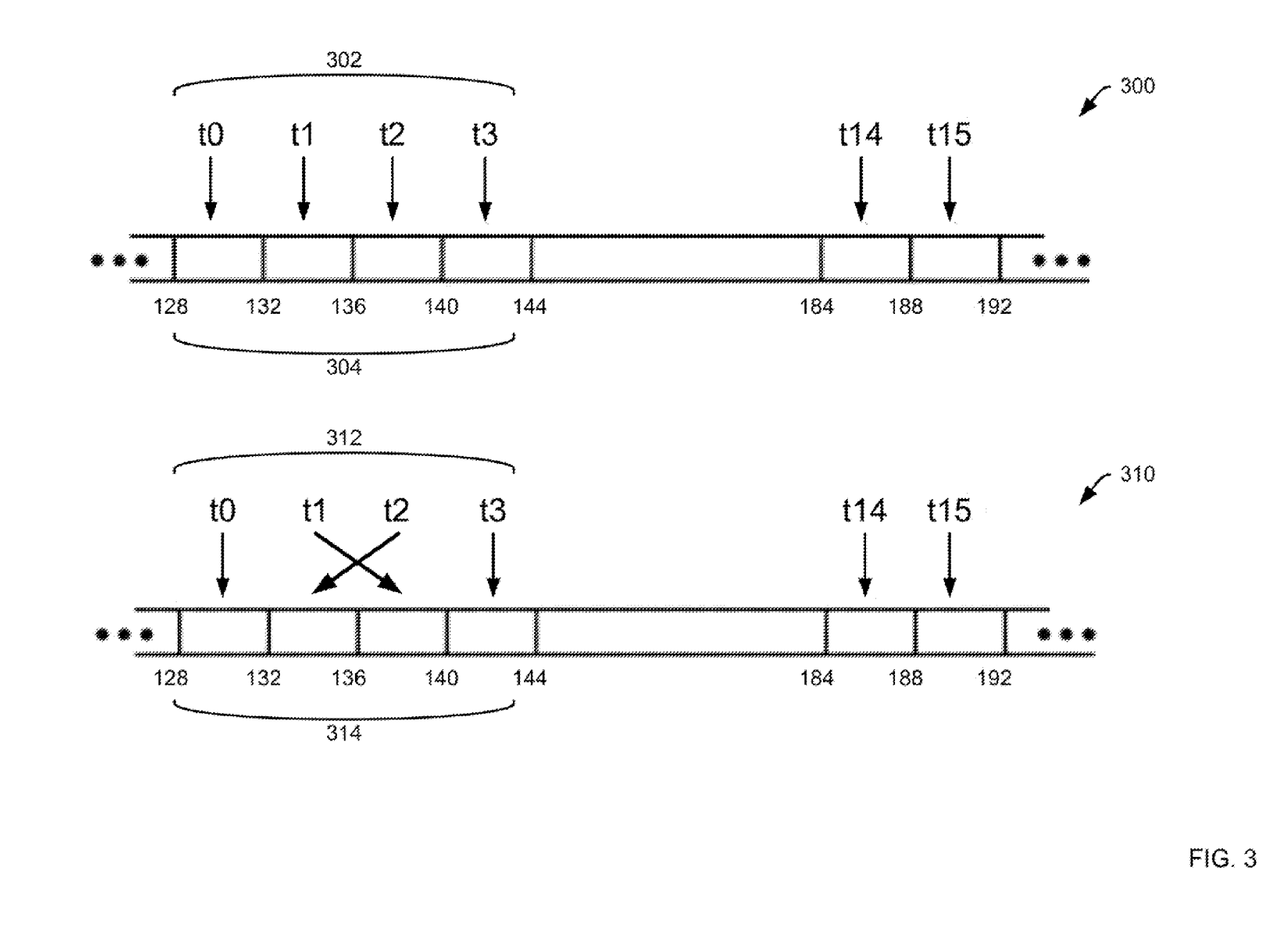
FIG. 3 is an illustrative representation of a coalesced memory pattern and a non-coalesced memory pattern in accordance with embodiments of the present invention.

Embodiments described herein optimize memory utilization by a) utilizing parallelism effectively and efficiently, and b) coalescing reads from global memory. In utilizing parallelism effectively, parallel execution of database operations are executed over as many threads as possible at any given time on a GPU. In coalescing reads from global memory, contiguous regions of global memory may be operated upon by threads in a thread group. FIG. 3 is an illustrative representation of a coalesced memory pattern 300 and a non-coalesced memory pattern 310 in accordance with embodiments of the present invention. In coalesced memory pattern 300, threads to t0 to t3 302 are resident in order in memory 304. In contrast in non-coalesced memory pattern 310, threads t0 to t3 312 are resident out of order in memory 314. Coalesced memory patterns may provide processing efficiencies in some embodiments described herein. In some embodiments, hash partitioned relations may be loaded into GPU memory in a coalesced access pattern such that a contiguous region of GPU memory is utilized.

Figure 4:
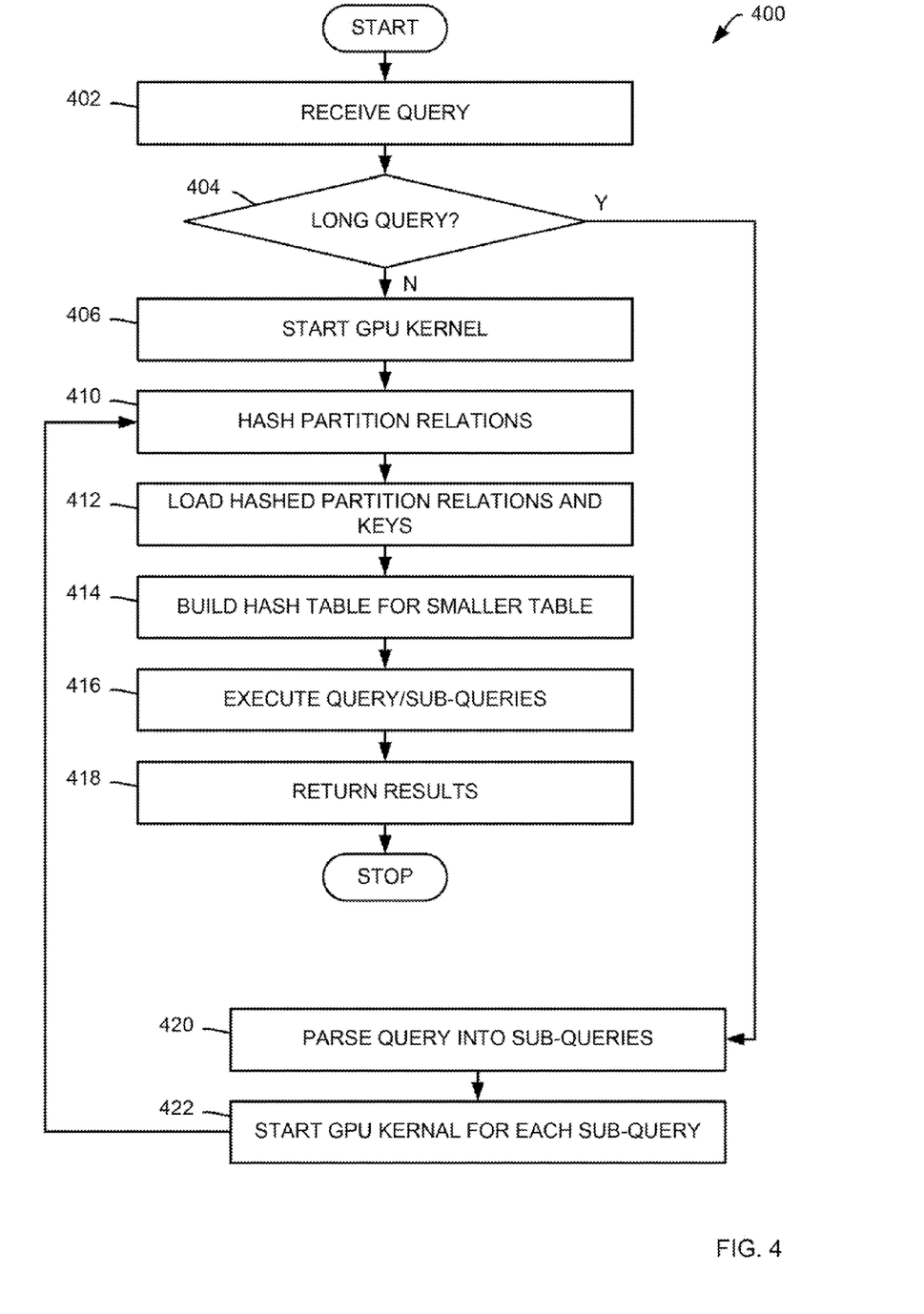
FIG. 4 is an illustrative flowchart of methods for providing GPU enabled database services in accordance with embodiments of the present invention.

FIG. 4 is an illustrative flowchart 400 of methods for providing GPU enabled database services in accordance with embodiments of the present invention. In particular, methods for parallel query execution of a database operation on a datable utilizing a GPU are illustrated. At a first step 402, the method receives a query. Queries may be received by a host in any manner known in the art without departing from the present invention. In embodiments, a query may include at least two database relations. At a next step 404, the method determines whether the received query is a long query. In embodiments, a long query may require additional processing steps. If the method determines at a step 404 that the query is not a long query, the method continues to a step 406 to start a GPU kernel whereupon the method continues to a step 410. If the method determines at a step 404 that the query is a long query, the method continues to a step 420 to parse the long query into a number of sub-queries. Partitioning long queries provides an advantage of executing queries in parallel across several GPU kernels. As such, at a next step 422, the method starts a GPU kernel for each sub-query. Sub-queries may be determined based on a variety of parameters in embodiments including, for example, size. That is, a sub-query may be determined based on whether the sub-query will fit into GPU memory.

The method continues to a step 410 to hash partition all relations by GPU kernel(s). Hash partitioning may be accomplished utilizing in any manner known in the art without departing from the present invention. At a next step 412, the method loads hashed partition relations and keys into GPU memory. At a next step 414, the method builds a hash table for the smaller table and, at a step 416, executes the query or sub-queries by GPU kernel(s). Results returned at a step 416 may be written first to GPU device memory and then host memory accessible by a user whereupon the method ends.

In one example embodiment, consider a case of a JOIN between two database relations R and S. Assume the relations are small-enough to fit into the GPU memory. Thus, the example is not a large query. Embodiments then hash partition both relations (R and S) and bring in the same keyed partition from both relations into GPU memory. Embodiments then build a hash table for the smaller table and probe the other relation for matches. In one embodiment, hash is performed on the join key. If relations are bigger than the available GPU memory, multiple hash functions may be utilized to reduce the size. In a case of a long query embodiment with many operators, the long query may be partitioned the query into several sub-queries that may be executed in parallel and then combined after processing.

It may be appreciated that at least some in-memory issues associated with GPU enabled database processing such as: table choice, concurrency, data volatility, and memory consumption. In embodiments utilizing CEILADB™, table choice may be tied to number of accesses/second made to the table. In further embodiments utilizing CEILADB™, concurrency may be compromised because thread blocks may be working in a same shared multiprocessor. As such, in embodiments, a call such as SYNCTHREADS (from a CUDA™ Library) will synchronize the threads in the same shared multiprocessor. However, any similar call may be made without departing from embodiments disclosed herein. If two threads from two different shared multiprocessors want to write data, they must synchronize through the global memory. In further embodiments utilizing CEILADB™, volatility may be solved by implementing a function that will store the data from the GPU to the disk. In further embodiments utilizing CEILADB™, memory consumption may be solved by enabling a user, at any time, to query the amount of memory being used by the tables created by the user. The user can also set memory consumption parameters which control the way data is written to memory or to disk—every time or when the used memory.

Figure 5:
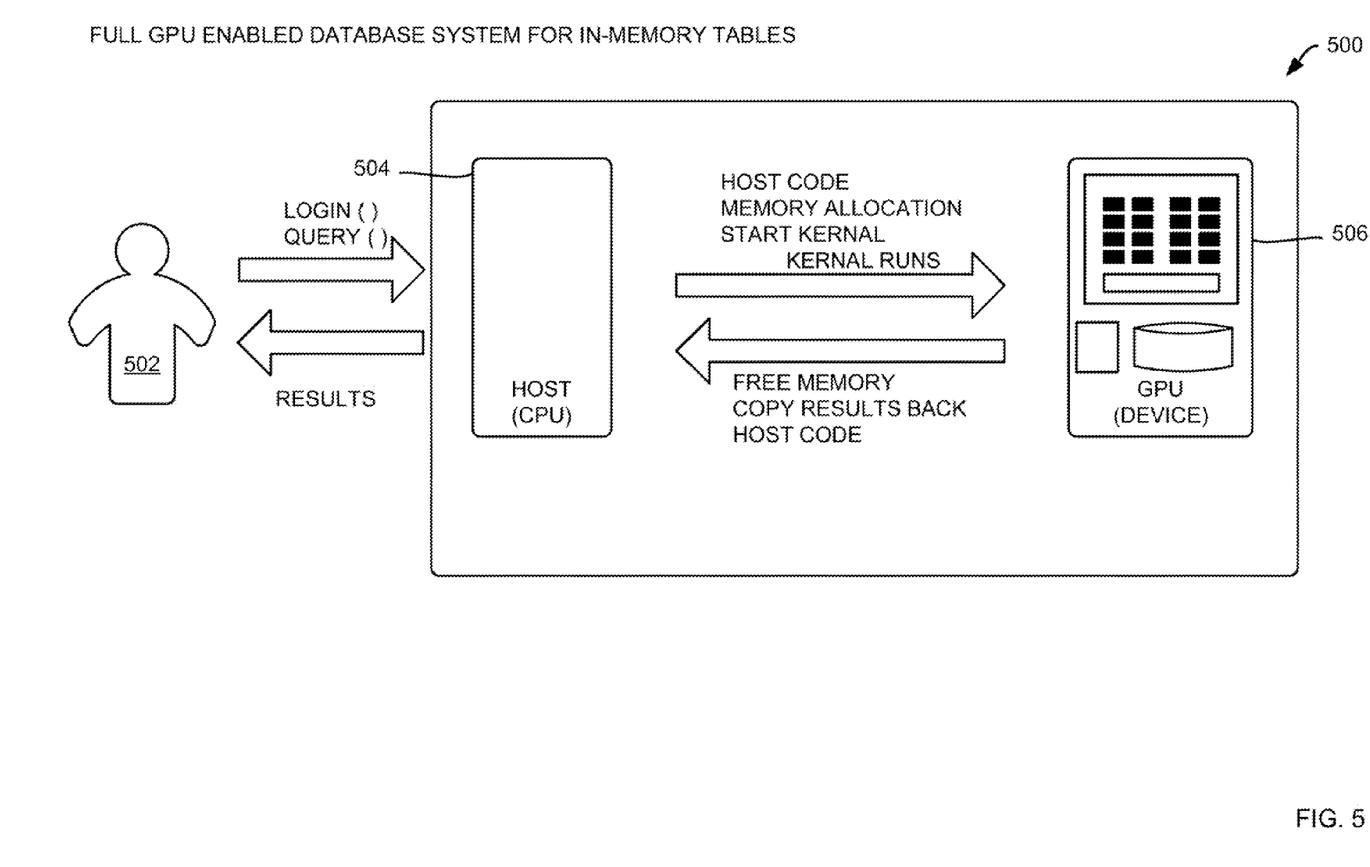
FIG. 5 is an illustrative representation of a full GPU enabled database system utilizing in-memory tables in accordance with embodiments of the present invention.

The following examples are provided for clarity in understanding embodiments of the present invention and should not be construed as limiting. FIG. 5 is an illustrative representation of a full GPU enabled database system 500 utilizing in-memory tables in accordance with embodiments of the present invention. In the illustrated embodiment, a user 502 may log on to host 504 either locally or remotely to make queries. In some embodiments, the host is a CPU. In some embodiments, queries are SQL-type queries. Queries may be sent to GPU 506, executed on GPU 506, and returned to host 504. Results may then be returned to user 502. As noted above, in embodiments, a GPU may be a G80 architecture compliant GPU. As illustrated, GPU 506 may be configured to utilize in-memory tables. As such, in embodiments, database data and database keys may be stored on the GPU memory, which memory may be shared in some embodiments. Because database data and database keys reside entirely in GPU memory, performance advantages may be achieved. However, due to the limited size of GPU memory, limitations in database table size may be required in embodiments. As noted above, in embodiments utilizing CEILADB™ memory consumption may be solved by enabling a user, at any time, to query the amount of memory being used by the tables created by the user. The user can also set memory consumption parameters which control the way data is written to memory or to disk—every time or when the used memory.

Figure 6:
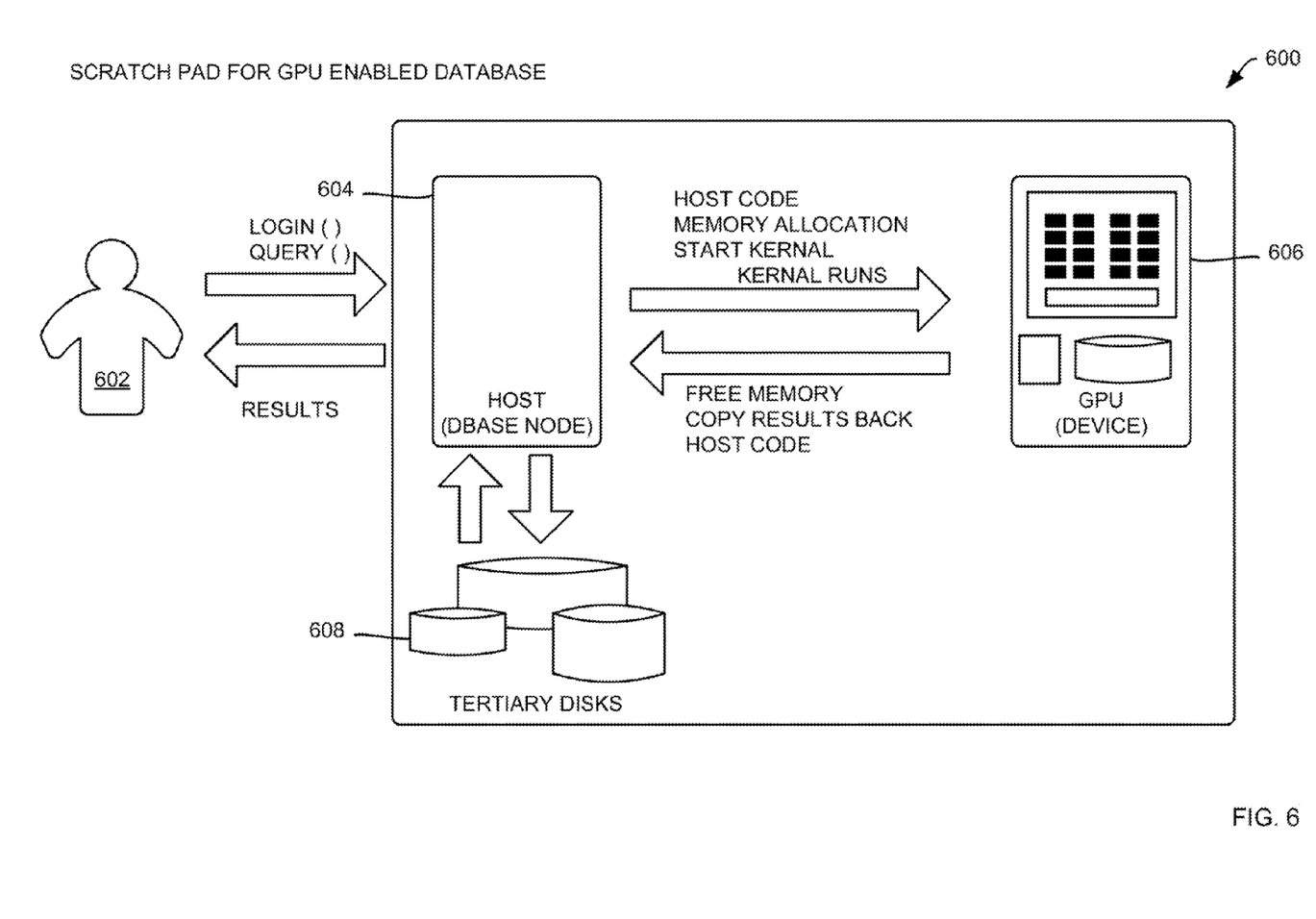
FIG. 6 is an illustrative representation of a scratch pad for a GPU enabled database system in accordance with embodiments of the present invention.

FIG. 6 is an illustrative representation of a scratch pad for a GPU enabled database system 600 in accordance with embodiments of the present invention. In the illustrated embodiment, a user 602 may log on to host 604 either locally or remotely to make queries. In some embodiments, the host is a database node. In some embodiments, queries are SQL-type queries. Queries may be sent to GPU 606, executed on CPU 606, and returned to host 604. Results may then be returned to user 602. As noted above, in embodiments, a GPU may be a G80 architecture compliant GPU. In this embodiment, a user may exploit the high computational power and memory bandwidth of the GPU for accelerating database queries of other database systems since the host, in this example, is a database node. As above, in embodiments, database data and database keys may be stored on the GPU memory, which memory may be shared in some embodiments. In addition, in embodiments, database data and database keys may be stored on the tertiary disks 608. In embodiments, in making queries to a commercial database, user 602 is unaware that queries are processed by GPU 606.

Figure 7:
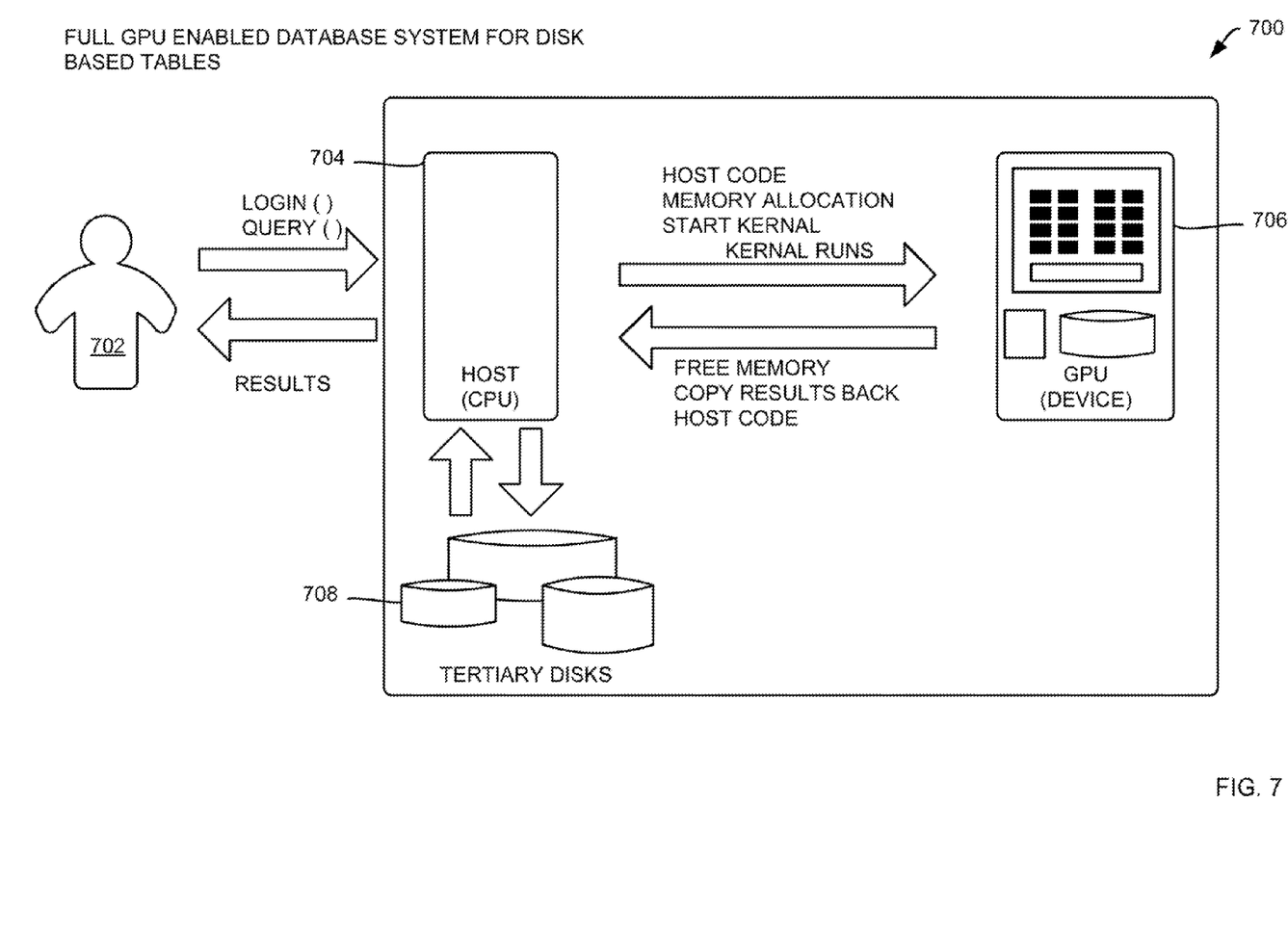
FIG. 7 is an illustrative representation of a full GPU enabled database system utilizing disk based tables in accordance with embodiments of the present invention.

FIG. 7 is an illustrative representation of a full GPU enabled database system 700 utilizing disk based tables in accordance with embodiments of the present invention. In the illustrated embodiment, a user 702 may log on to host 704 either locally or remotely to make queries. In some embodiments, the host is a CPU. In some embodiments, queries are SQL-type queries. Queries may be sent to GPU 706, executed on GPU 706, and returned to host 704. Results may then be returned to user 702. As noted above, in embodiments, a GPU may be a G80 architecture compliant CPU. In this embodiment, when a user is dealing with huge volumes of data, it may not be possible to store all the data in the GPU memory. Hence, in embodiments, database data and database keys may be stored on tertiary disks 708. In addition, in embodiments, database keys may be stored on GPU memory. As such, a host copy will be used when fetching data from the disks and GPU device copy will be used to access tuples in GPU memory. After insert operations to a database all copies must by synched to avoid inconsistencies. In some embodiments, it is imperative to pipeline the disk accesses with computations in order to achieve significant performance increases.

While this invention has been described in terms of several embodiments, there are alterations, permutations, and equivalents, which fall within the scope of this invention. It should also be noted that there are many alternative ways of implementing the methods, computer program products, and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A method for resolving a plurality of in-memory issues associated with parallel query execution of a database operation on a database utilizing a graphics processing unit (GPU) having a plurality of GPU multiprocessors, the method comprising:

tying a table choice to a number of accesses per second made to a table such that selection of the table choice corresponds with the number of accesses per second made to the table, wherein the table choice is a first of the plurality of in-memory issues; and synchronizing threads in a same shared GPU multiprocessor using a first thread synchronization call through a local memory to avoid thread blocks and to maintain concurrency in the same shared GPU multiprocessor, wherein each of the plurality of GPU multiprocessors includes the local memory shared by threads running on the same shared GPU multiprocessor; and synchronizing threads in a different shared GPU multiprocessor using a second thread synchronization call through a global memory to maintain concurrency, wherein concurrency is a second of the plurality of in-memory issues, wherein the global memory is shared between the plurality of GPU multiprocessors, and wherein the parallel query execution of the database operation is performed solely by the GPU.

2. The method of claim 1, further comprising:
storing data from the GPU to a disk to solve volatility, wherein volatility of data is a third of the plurality of in-memory issues; and
enabling a user, at any time, to query the amount of memory being used by the table created by the user to monitor memory consumption, wherein memory consumption is a fourth of the plurality of in-memory issues.

3. The method of claim 2, further comprising:
setting memory consumption parameters to control a manner in which data is written to the memory or the disk.

4. The method of claim 1, further comprising:
synchronizing threads in different shared GPU multiprocessors through a global memory to avoid compromising concurrency.

5. The method of claim 1, wherein the table is a GPU in-memory table.

6. The method of claim 1, wherein the parallel execution comprises:
receiving a query by a host, the query including at least two database relations;
starting at least one GPU kernel of a plurality of GPU kernels, wherein the at least one GPU kernels include a GPU memory allocated at runtime;
hash partitioning the at least two database relations by the GPU kernel resulting in at least two hash partitioned database relations, wherein each of the at least two hash partitioned database relations includes a partition key;
loading the at least two hash partitioned database relations into the GPU memory;
loading the at least two hash partitioned database relations and partition keys corresponding with the at least two hash partitioned database relations into the GPU memory;
building a hash table for a smaller of the at least two hash partitioned database relations; and
executing the query by the at least one GPU kernel thereby providing in hash table GPU memory access.

7. A computing device program product for resolving a plurality of in-memory issues associated with parallel query execution of a database operation on a database utilizing a graphics processing unit (GPU) having a plurality of GPU multiprocessors, the method comprising:
a computer readable medium;
first programmatic instructions for tying a table choice to a number of accesses per second made to a table such that selection of the table choice corresponds with the number of accesses per second made to the table, wherein the table choice is a first of the plurality of in-memory issues; and
second programmatic instructions synchronizing threads in a same shared GPU multiprocessor using a first thread synchronization call through a local memory to avoid thread blocks and to maintain concurrency in the same shared GPU multiprocessor, wherein each of the plurality of GPU multiprocessors includes the local memory shared by threads running on the same shared GPU multiprocessor; and
synchronizing threads in a different shared GPU multiprocessor using a second thread synchronization call through a global memory to maintain concurrency, wherein concurrency is a second of the plurality of in-memory issues, wherein the global memory is shared between the plurality of GPU multiprocessors, wherein the parallel query execution of the database operation is performed solely by the GPU, and wherein the programmatic instructions are stored on the computer readable storage medium.

8. The program product of claim 7, further comprising:
third programmatic instructions storing data from the GPU to a disk to solve volatility, wherein volatility of data is a third of the plurality of in-memory issues; and
fourth programmatic instructions enabling a user, at any time, to query the amount of memory being used by the table created by the user to monitor memory consumption, wherein memory consumption is a fourth of the plurality of in-memory issues.

9. The program product of claim 8, further comprising:
fifth programmatic instructions setting memory consumption parameters to control a manner in which data is written to the memory or the disk.

10. The program product of claim 7, further comprising:
sixth programmatic instructions synchronizing threads in different shared GPU multiprocessors through a global memory to avoid compromising concurrency.

11. The program product of claim 7, wherein the table is a GPU in-memory table.

12. The program product of claim 7, wherein the parallel execution comprises:
receiving a query by a host, the query including at least two database relations;
starting at least one GPU kernel of a plurality of GPU kernels, wherein the at least one GPU kernels include a GPU memory allocated at runtime;
hash partitioning the at least two database relations by the GPU kernel resulting in at least two hash partitioned database relations, wherein each of the at least two hash partitioned database relations includes a partition key;
loading the at least two hash partitioned database relations into the GPU memory;
loading the at least two hash partitioned database relations and partition keys corresponding with the at least two hash partitioned database relations into the GPU memory;
building a hash table for a smaller of the at least two hash partitioned database relations; and
executing the query by the at least one GPU kernel thereby providing in hash table GPU memory access.

13. A graphics processing unit (GPU) having a plurality of GPU multiprocessors enabled database system for parallel query execution comprising:
a database; and
a GPU in communication with the database, wherein
the GPU is configured resolving a plurality of in-memory issues associated with parallel query execution of a database operation on the database utilizing the GPU, the resolving including,
tying a table choice to a number of accesses per second made to a table such that selection of the table choice corresponds with the number of accesses per second made to the table, wherein the table choice is a first of the plurality of in-memory issues, and
synchronizing threads in a same shared GPU multiprocessor using a first thread synchronization call through a local memory to avoid thread blocks and to maintain concurrency in the same shared GPU multiprocessor, wherein each of the plurality of GPU multiprocessors includes the local memory shared by threads running on the same shared GPU multiprocessor; and synchronizing threads in a different shared GPU multiprocessor using a second thread synchronization call through a global memory to maintain concurrency wherein concurrency is a second of the plurality of in-memory issues, wherein the global memory is shared between the plurality of GPU multiprocessors, and wherein the parallel query execution of the database operation is performed solely by the GPU.

14. The system of claim 13, wherein the resolving further comprises:
storing data from the GPU to a disk to solve volatility, wherein volatility of data is a third of the plurality of in-memory issues; and
enabling a user, at any time, to query the amount of memory being used by the table created by the user to monitor memory consumption, wherein memory consumption is a fourth of the plurality of in-memory issues.

15. The system of claim 14 wherein the resolving further comprises:
setting memory consumption parameters to control a manner in which data is written to the memory or the disk.

16. The system of claim 13, wherein the resolving further comprises:
synchronizing threads in different shared GPU multiprocessors through a global memory to avoid compromising concurrency.

17. The system of claim 13, wherein the parallel execution comprises:
receiving a query by a host, the query including at least two database relations;
starting at least one GPU kernel of a plurality of GPU kernels, wherein the at least one GPU kernels include a GPU memory allocated at runtime;
hash partitioning the at least two database relations by the GPU kernel resulting in at least two hash partitioned database relations, wherein each of the at least two hash partitioned database relations includes a partition key;
loading the at least two hash partitioned database relations into the GPU memory;
loading the at least two hash partitioned database relations and partition keys corresponding with the at least two hash partitioned database relations into the GPU memory;
building a hash table for a smaller of the at least two hash partitioned database relations; and
executing the query by the at least one GPU kernel thereby providing in hash table GPU memory access.

* * * * *